(12) United States Patent
Bolton et al.

(10) Patent No.: US 9,992,311 B2
(45) Date of Patent: Jun. 5, 2018

(54) CORRECT PORT IDENTIFICATION IN A NETWORK HOST CONNECTION

(71) Applicant: International Business Machines Corporation, Armonk, NY (US)

(72) Inventors: Stephen P. Bolton, Hampshire (GB); Stewart O. M. Francis, Hampshire (GB); David J. Nice, Southampton (GB); Joseph R. Winchester, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 561 days.

(21) Appl. No.: 14/487,556

(22) Filed: Sep. 16, 2014

(65) Prior Publication Data

US 2015/0163327 A1     Jun. 11, 2015

(30) Foreign Application Priority Data

Dec. 5, 2013   (GB) .................................. 1321508.2

(51) Int. Cl.
*H04L 29/08* (2006.01)
*G06F 15/16* (2006.01)
(Continued)

(52) U.S. Cl.
CPC .............. *H04L 69/40* (2013.01); *H04L 67/42* (2013.01); *H04L 69/02* (2013.01)

(58) Field of Classification Search
CPC ..... H04L 29/08; H04L 67/1027; H04L 29/06; G06F 15/16
See application file for complete search history.

(56) References Cited

U.S. PATENT DOCUMENTS

| 7,213,063 B2 * | 5/2007 | Bressoud | H04L 29/06 709/203 |
| 7,275,106 B1 * | 9/2007 | Bean | G06F 9/4856 455/422.1 |

(Continued)

FOREIGN PATENT DOCUMENTS

| EP | 1145488 B1 | 1/2009 |
| WO | WO01/78350 A1 | 10/2001 |

OTHER PUBLICATIONS

Rodolphe Marques, Andre Zuquete; User-Centric, Private Networks of Services, IEEE Xplore: Nov. 7, 2013.*

(Continued)

*Primary Examiner* — Kevin Bates
*Assistant Examiner* — Mark A Scott
(74) *Attorney, Agent, or Firm* — Francis Lammes; Stephen J. Walder, Jr.; Joseph PetroKaitis (57) ABSTRACT

A mechanism is provided for correct port identification in a network host connection. A registry is created for a network host of a set of ports on the network host and services listening on each port of the set of ports, the registry including registered information capable of identifying each service provided by each port. The registered information is provided in a client connection request to the service. Client information is received from a client requiring identification of a correct port for connection to a service. The registry is searched for a match for the client information with the registered information registered at the registry for a service listening on one or more ports. The client is provided with details of the one or more ports.

18 Claims, 4 Drawing Sheets

(51) Int. Cl.
  *H04L 29/06* (2006.01)
  *H04L 29/12* (2006.01)
  *H04L 29/14* (2006.01)

(56) References Cited

U.S. PATENT DOCUMENTS

| | | | |
|---|---|---|---|
| 7,779,086 B1 | 8/2010 | Gammo et al. | |
| 8,019,849 B1* | 9/2011 | Lopilato | H04L 67/1097 709/203 |
| 8,180,891 B1* | 5/2012 | Harrison | H04L 63/10 709/224 |
| 8,972,558 B1* | 3/2015 | Horton | G06F 9/542 709/203 |
| 2005/0165885 A1* | 7/2005 | Wong | H04L 67/1027 709/201 |
| 2005/0169273 A1* | 8/2005 | Gadde | H04L 29/06 370/392 |
| 2006/0075089 A1* | 4/2006 | Alam | H04L 67/22 709/224 |
| 2006/0129676 A1* | 6/2006 | Modi | H04L 29/12009 709/227 |
| 2006/0155814 A1* | 7/2006 | Bennett | H04L 29/06027 709/207 |
| 2006/0206614 A1* | 9/2006 | Kaczmarski | H04L 63/08 709/228 |
| 2006/0239297 A1* | 10/2006 | Rao | H04L 29/12047 370/469 |
| 2007/0153812 A1* | 7/2007 | Kemp | H04L 29/12509 370/401 |
| 2008/0120412 A1* | 5/2008 | Icaza | H04L 67/16 709/225 |
| 2008/0147885 A1 | 6/2008 | Bessis | |
| 2009/0037998 A1* | 2/2009 | Adhya | G06Q 20/027 726/11 |
| 2009/0049175 A1* | 2/2009 | Finn | H04L 12/462 709/226 |
| 2009/0125580 A1* | 5/2009 | Canning | H04L 67/36 709/203 |
| 2009/0222578 A1* | 9/2009 | Schneider | H04L 63/029 709/238 |
| 2010/0287227 A1* | 11/2010 | Goel | H04L 67/1002 709/202 |
| 2011/0161500 A1* | 6/2011 | Yengalasetti | H04N 21/6437 709/227 |
| 2012/0072548 A1* | 3/2012 | Kim | H04L 61/1535 709/219 |
| 2012/0158975 A1* | 6/2012 | Hogoboom | H04L 69/22 709/228 |
| 2012/0254374 A1* | 10/2012 | Wheeler | H04L 61/2076 709/220 |
| 2012/0317254 A1* | 12/2012 | Chekhanovskiy | H04L 61/1511 709/222 |
| 2013/0042162 A1 | 2/2013 | Muthu | |
| 2013/0166628 A1* | 6/2013 | Theado | G06Q 20/20 709/203 |
| 2013/0179982 A1* | 7/2013 | Bridges | H04L 63/0823 726/26 |
| 2013/0301598 A1 | 11/2013 | Holm et al. | |
| 2013/0339509 A1* | 12/2013 | Johnson | H04L 41/14 709/223 |
| 2014/0122723 A1* | 5/2014 | Glover | G06F 9/5072 709/226 |
| 2014/0245262 A1* | 8/2014 | Hill | G06F 8/70 717/120 |
| 2014/0337509 A1* | 11/2014 | Manghirmalani | G06F 11/3006 709/224 |
| 2014/0373161 A1* | 12/2014 | Hudson | H04L 63/1433 726/25 |
| 2015/0245393 A1* | 8/2015 | Lee | H04W 8/005 370/338 |

OTHER PUBLICATIONS

Search Report under Section 17(5) dated May 15, 2014, Application No. GB1321508.2, 2 pages.
"Attempting connection to CICS on wrong TCP/IP port", IBM Corporation, http://pic.dhe.ibm.com/infocenter/cicstgmp/v9r0/index.jsp?topic=%2Fcom.ibm.cics.tg.doc%2Fctgunx%2Fipic_auto_trouble.html, May 28, 2013, 2 pages.
"Avoiding TCP/IP Port Exhaustion", msdn.microsoft.com/en-us/library/aa560610(v=bts.20).aspx, May 31, 2013, 7 pages.

* cited by examiner

CORRECT PORT IDENTIFICATION IN A NETWORK HOST CONNECTION

BACKGROUND

This invention relates to the field of port identification in a network host connection. In particular, the invention relates to correct port identification in a network host connection when a user is connecting to a network service.

In computer networks, a port is provided as a communication endpoint at a network host or node. A port is associated with an Internet Protocol (IP) address of the network host. The host or node may be a server in the network.

A port is used to identify different applications or processes running on a host enabling them to share a single physical connection to the network. The protocols that mainly use ports are the transport layer protocols, for example, Transmission Control Protocol (TCP) and User Datagram Protocol (UDP).

A port is identified for each address and protocol by a 16-bit number, known as the port number. The port number plus a computer's IP address forms the destination address for a communications session. Data packets may be routed across a network to a destination IP address, and then further routed to the specific process bound to the destination port number.

In one scenario, a server can have more than one way for an Internet protocol suite (TCP/IP) connection to be established to it, such as one for a debug listener agent and one for a runtime application programming interface (API), or different uniform resource locators (URLs) for different types of services.

A user or client may know the server name and a message, but may either not know the port or may specify an incorrect port.

An example of this may be considered in a database, an application server, or a message queue manager where different ports are configured for different purposes, such as for connection purposes to get and put data, or for debugging, or issuing Structured Query Language (SQL) commands, and so forth.

The client may know a message, e.g. "http://server:port/startdebug=true", or "http://server:port/getqueue?name=fred", and the client may know the server, but they do not know the port which is the variable portion.

A ping command allows a client to test whether a server:port combination has a listener on it, in which case a port can be pinged and will reply. This enables a user to test whether a port is active. However, it is not possible to test which port is configured for which protocol.

One technique is to test every single port for the message. The problem with this is that the message sent to the wrong port might have undesired effects. It could, in the worst case, crash and bring down another server or cause unexpected data corruption. Therefore, this kind of message shotgun approach is not generally encouraged.

An example of an incorrect port being specified is described in a transactions server such as Customer Information Control System (CICS) of International Business Machines Corporation (CICS is a trade mark of International Business Machines Corporation, registered in many jurisdictions).

A CICS region may have different ports for connecting to it for its systems management API—one for a connection type known as "CPSM Data" (CICSPlex System Manager Data) for older CICS regions and one for a connection type known as "CMCI" (CICS Management Client Interface) for newer CICS regions (CICSPlex is a trade mark of International Business Machines Corporation, registered in many jurisdictions). A CICS region can also have other ports defined to it that route to other programs running other services, such as for CICS tools or debug ports.

The problem that users encounter is that they try to connect to a particular service, and specify the wrong port. They do not receive the equivalent of an error message that the port is unavailable, instead the error they receive is where the application has typically tried to send a message for one program/service to another program/service and unpredictable results have occurred. Often this can be a SAX (Simple API for XML) parse exception where XML (Extensible Markup Language) was expected but HTML (HyperText Markup Language) was returned, or a "missing <hr>" tag where HTML was expected but XML was received, and so forth. At best, the application might parse the response and just inform the user that they have specified the wrong port. In this case, the user either has to change the port, or change the type of connection they are to establish.

A known solution to this is for the user to diagnose the error they have got as being the symptom of having connected to the wrong port, and for them to either change the port or change the type of connection they are establishing. This is time consuming, and it involves the user knowing the correct alternative port.

Therefore, there is a need in the art to address the aforementioned problems.

SUMMARY

In one embodiment, a method, in a data processing system is provided for correct port identification in a network host connection. The illustrative embodiment creates a registry for a network host of a set of ports on the network host and services listening on each port, of the set of ports, the registry including registered information capable of identifying each service provided by each port In the illustrative embodiment, the registered information is provided in a client connection request to that service. The illustrative embodiment receives client information from a client requiring identification of a correct port for connection to a service. The illustrative embodiment searches the registry for a match for the client information with the registered information registered at the registry for a service listening on one or more ports. The illustrative embodiment provides the client with details of the one or more ports.

In yet other illustrative embodiments, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

In yet another illustrative embodiment, a computer program product comprising a computer useable or readable medium having a computer readable program is provided. The computer readable program, when executed on a computing device, causes the computing device to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The subject matter regarded as the invention is particularly pointed out and distinctly claimed in the concluding portion of the specification. The invention, both as to organization and method of operation, together with objects, features, and advantages thereof may best be understood by reference to the following detailed description when read with the accompanying drawings.

Preferred embodiments of the present invention will now be described, by way of example only, with reference to the following drawings in which.

DETAILED DESCRIPTION

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Method and system are provided for correct port identification in a network host connection when a user is connecting to a network service.

A central lookup or registry is provided at a network host to provide a list of ports at the network host with details of the services listening at each port and information capable of identifying each service.

In one embodiment, an incoming connection attempt using a given protocol but an incorrect port may prompt a registry service to look up the available services and the protocols they use in order to determine possible correct ports for connection.

In another embodiment, a user may query the registry service directly to obtain assistance in identifying a correct port to use for connection to a service.

Figure 1:
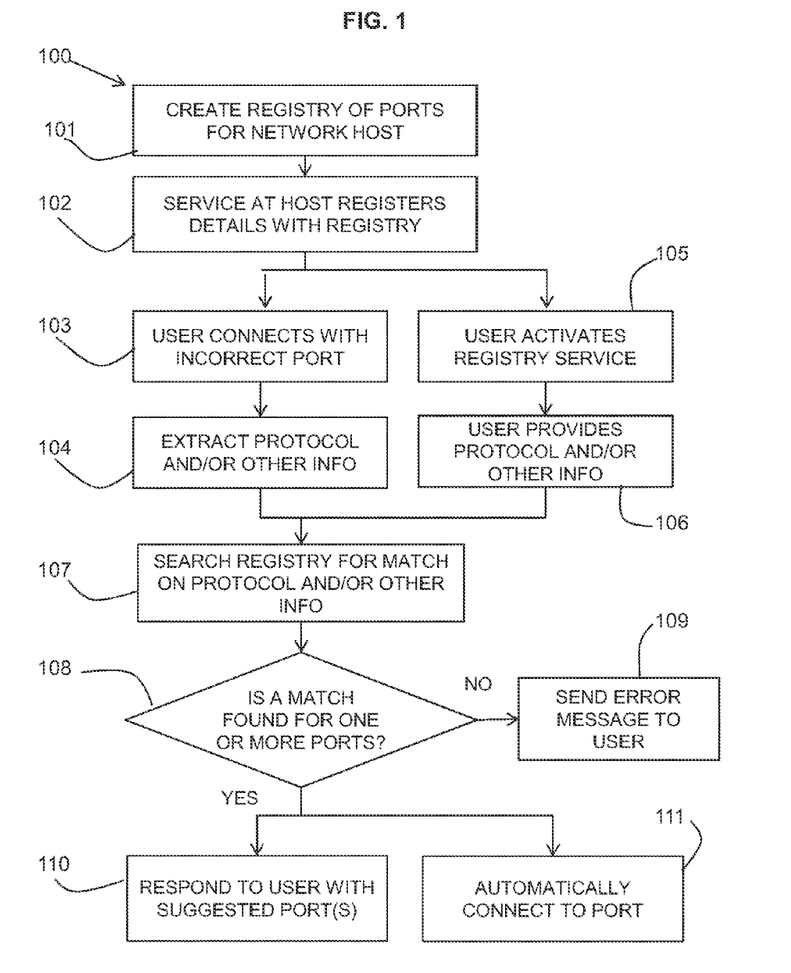
FIG. 1 is a flow diagram of an example embodiment of a method in accordance with the present invention.

Referring to FIG. 1, a flow diagram illustrates an example embodiment of the described method 100.

As a preliminary step, a registry may be created 101 of ports at a network host. For each port, one or more services may be registered as a listener on the port. Generally, one service may listen on one port although it is possible for more than one service to listen with an agreed handshake once the connection is initiated to determine which service would handle the request.

The services may be registered with a listening port number, listening IP address, and a way of identifying the protocol being spoken. Additionally, known connection messages for a service may be registered with the registry. The registered information enables the registry to be able to identify which is the correct port number for a service out of the possibilities. Optionally, the registry may store information on which services are currently listening on a port.

In one embodiment, a service may register 102 their details with the registry, providing details of their protocol and any other additional information in association with one or more ports. In another embodiment, the ports and services may be pre-configured.

In either scenario the end result is the same which is that a list of all known ports exist for a network host together with knowledge of which port is for which service. In the case where the services register themselves, a list of message headers for identifying/establishing the connection may be provided to the registry when the port listener for the service was created.

In one scenario, a user may try to connect 103 to a service at the network host using an incorrect port which activates a registry service at the network port. The registry service extracts 104 the protocol information from the failed connection attempt together with any other information such as the URL or connection message. For example, the URL requested when a user tries to connect may show that the user was attempting to make a CMCI connection whilst the CPSM data port was the one being used.

In another scenario, a user may directly activate 105 the registry service at the network port to obtain port information and may provide 106 the registry service with protocol and/or additional information regarding the service to be connected to.

The registry service 107 may search the registry for a match on the protocol and/or additional information provided by the client.

It is determined if a match of one or more ports is found 108. If no match is found, an error message may be sent 109 to the user.

If one or more ports are found for a service which matches the connection information provided by the user, the method may respond 110 to the user with the suggested port(s) or may automatically connect 111 the user to a port.

Figure 2:
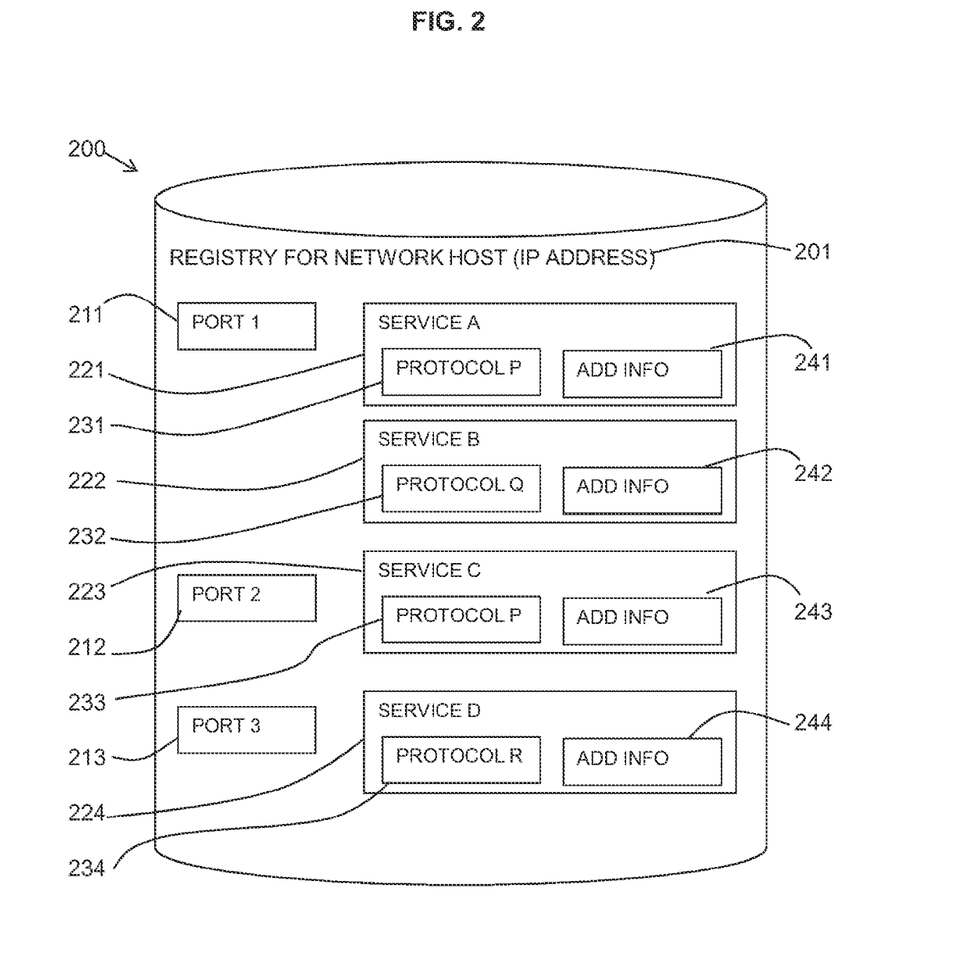
FIG. 2 is a schematic diagram of an example embodiment of a registry in accordance with the present invention.

Referring to FIG. 2, a schematic diagram shows an excerpt of an example registry 200. The registry is for a network host which has an IP address 201. The ports 211-213 are listed in the registry 200. For each port 211-213 one or more services 221-224 listening on a port may be registered together with the protocol 231-234 that the service uses and any other additional information 241-244 such as the URL of the service, connection messages for the service, and the service name.

Figure 3:
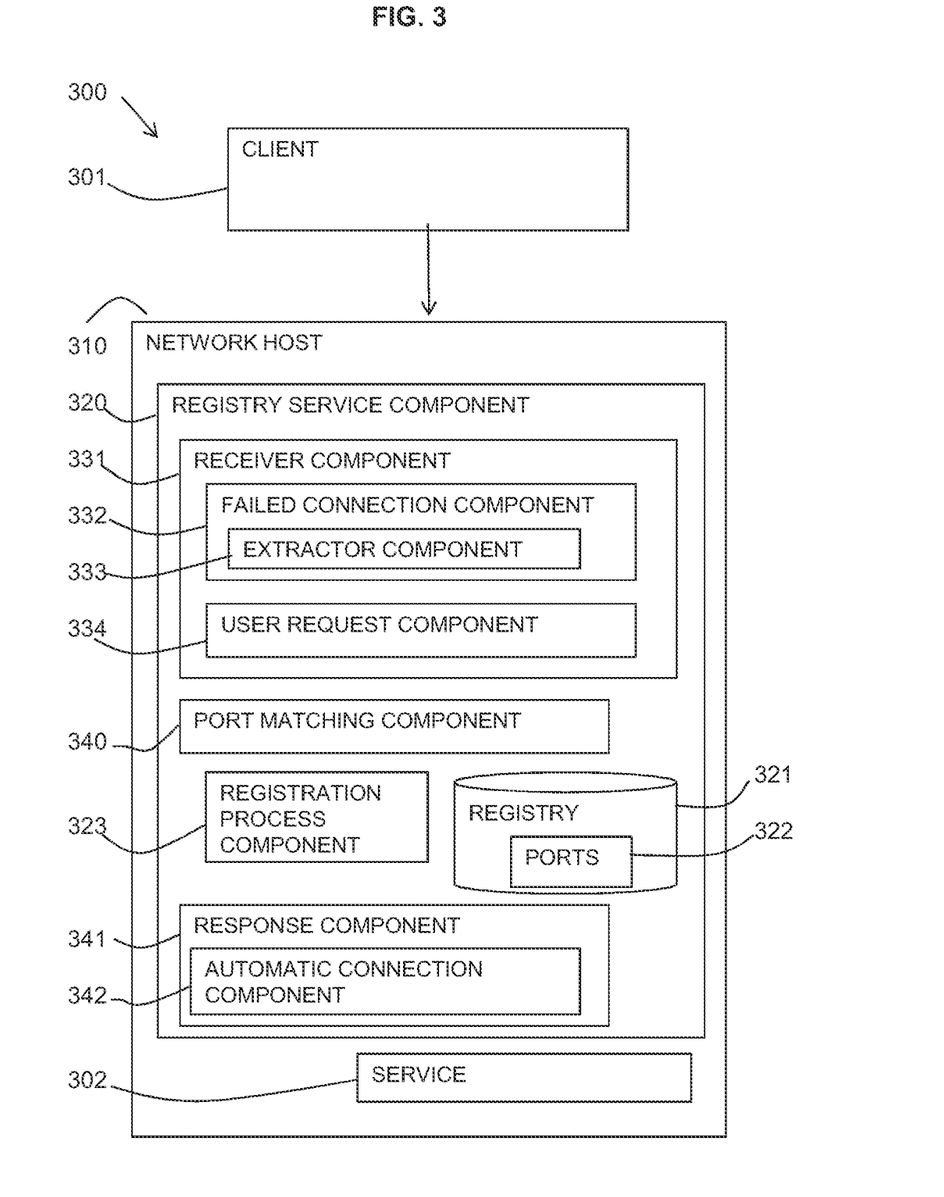
FIG. 3 is block diagram of an example embodiment of a system in accordance with the present invention.

Referring to FIG. 3, a block diagram shows an example embodiment of the described system 300.

A system 300 is shown including a network host 310 which may be a database, an application server, a transaction server, a message queue manager or other form of networked computer device having connection ports. A user or client 301 may wish to connect to the network host 310 to access a service 302 provided at the network host 310.

A registry service component 320 may be provided at the network host 310 which may aid a user to connect to the required service 302 when the user has the incorrect port for the service 302 at the network host 310 or has no details of the required port.

The registry service component 320 may maintain a registry 321, for example of the form described in relation to FIG. 2. The registry 321 has listed ports 322 each with listening services with associated protocols and other information.

The registry service component 320 may include a registration process component 323 for a service to register its details with the registry 320.

The registry service component 320 may include a receiver component 331. The receiver component 331 may include a failed connection component 332 for receiving a user connection with an incorrect port. The failed connection component 332 may include an extractor component 333 for extracting the protocol and/or other information from the failed connection attempt.

The receiver component 320 may include a user request component 334 for receiving a user request for port information including details of the protocol and/or service required.

The registry service component 320 may include a port matching component 340 for matching received protocol and/or other information to one or more ports by referencing the registry 321.

A response component 341 may respond to a user with an error message if no port was found, or with details of one or more ports with the correct protocol. An automatic connection component 342 may be provided for automatically connecting a user's failed connection attempt to the correct port.

Figure 4:
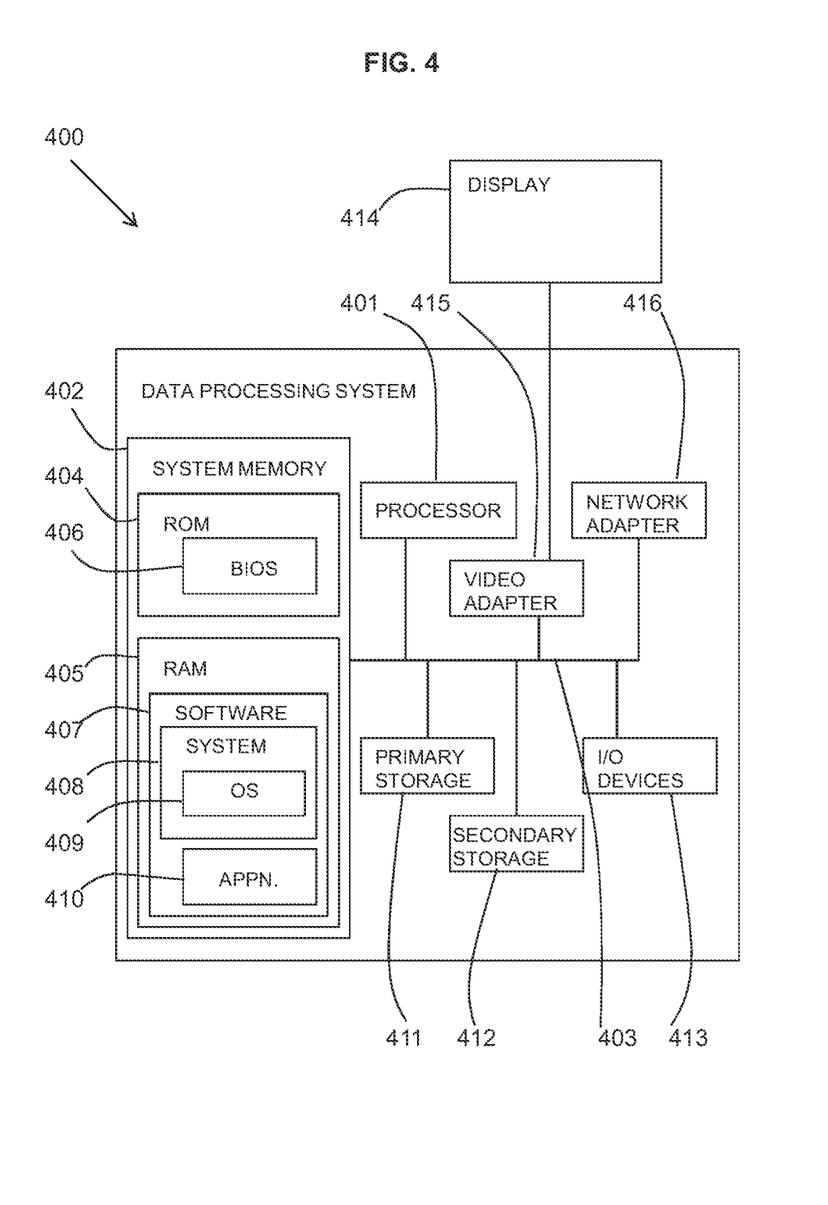
FIG. 4 is a block diagram of an embodiment of a computer system in which the present invention may be implemented.

Referring to FIG. 4, an exemplary system for implementing aspects of the invention includes a data processing system 400 suitable for storing and/or executing program code including at least one processor 401 coupled directly or indirectly to memory elements through a bus system 403. The memory elements may include local memory employed during actual execution of the program code, bulk storage, and cache memories which provide temporary storage of at least some program code in order to reduce the number of times code must be retrieved from bulk storage during execution.

The memory elements may include system memory 402 in the form of read only memory (ROM) 404 and random access memory (RAM) 405. A basic input/output system (BIOS) 406 may be stored in ROM 404. Software 407 may be stored in RAM 405 including system software 408 including operating system software 409. Software applications 410 may also be stored in RAM 405.

The system 400 may also include a primary storage means 411 such as a magnetic hard disk drive and secondary storage means 412 such as a magnetic disc drive and an optical disc drive. The drives and their associated computer-readable media provide non-volatile storage of computer-executable instructions, data structures, program modules and other data for the system 400. Software applications may be stored, on the primary and secondary storage means 411, 412 as well as the system memory 402.

The computing system 400 may operate in a networked environment using logical connections to one or more remote computers via a network adapter 416.

Input/output devices 413 may be coupled to the system either directly or through intervening I/O controllers. A user may enter commands and information into the system 400 through input devices such as a keyboard, pointing device, or other input devices (for example, microphone, joy stick, game pad, satellite dish, scanner, or the like). Output devices may include speakers, printers, etc. A display device 414 is also connected to system bus 403 via an interface, such as video adapter 415.

When a connection to the network host is made, the user has either connected to an incorrect port, or they want to see which port is available and are connecting to the described registry service. In one embodiment, a message may be sent to the service which includes the URL of the protocol they are looking to find. A match may be made based on the URL of the port against the list of known registered ports. For example, if the user was looking for "startdebug=true" then this would be compared to all the known ports in the registry which are available and gave this as their identification URL when they registered. When a port with this URL is found, the port would be returned. If more than one match is found then a list of ports is returned.

The advantage this has is that in situations where the server IP address is known (for example, for a database, an application server, queue manager) but the user does not know which port additional services are on (for example, debugging tools, profiling tools, or any other installed additional service), they can just ask the server for the ports and it will return them. The list of ports is always fresh because it is established when the port listeners are created, rather than a static list of ports.

In the case of CICS, this may be optimized so that there is no need for a registration step because TCP/IP services are defined to a CICS region (application server).

An example is described in the context of a CICS transaction server. As mentioned in the background section, a CICS region can have different ports for connecting to it for its systems management API—one for a connection type known as "CPSM Data" for older CICS regions and one for a connection type known as "CMCI" for newer CICS regions. A CICS region can also have other ports defined to it that route to other programs running other services, such as for CICS tools or debug ports.

The example is for a CICS region maintenance point into a CICSPlex system manager. If the user specifies that they want to connect to a CMCI port but incorrectly enter the port for the CPSM Data connection, then using the described method and system, the correct port may be returned in the message. Likewise if the user specifies that they want to connect to another service, such as a debug profile or an Interdependency Analyzer collector—both of which are services on defined ports on the CICS region—the disclosure describes a solution where the user can be returned the correct port based on matching the protocol to the available ports on the known TCP/IP services.

When the registry service determines that connection type is invalid, because an incorrect response was returned, a test is made to see if this is a valid systems management connection which can return the list of TCP/IP ports, the URI maps (these are CICS specific objects, but together they represent the URLs and also the services they can accept). These combinations of URLs, ports, and programs are then analysed and matched against the type of connection the user has made, and if a match is found then the user is either suggested to enter an alternative port, or the port of the connection can be changed automatically based on the application and user's preference.

For example, if the user tries to connect a CMCI connection to a CPSM Data port, the response to the application is recognized as being a CICS system management connection and the list of TCP/IP services and URI maps is queried.

These are then analysed to look for the EYUCMIC TCP/IP service, which is the correct CMCI port, and the user is told the correct port to use.

In another scenario, the user tries to connect a DTCN connection, but instead specifies the port for a Systems Management Connection. The DTCN Connection's correct port can be identified by analysing the URM of the TCP/IP service, so the DTCN port identifier would use this check which is custom to DTCN.

In another scenario the user might try to connect for a specific connection where the combination of the URI map and the TCP/IP service together (the URI map providing the signature URI) is enough to identify the correct port.

This is superior to current solutions because it avoids the user having to know the correct port; the only port they need to know is for the systems management connection. It also helps to proactively fix the problem, and also ensures that if the port for the particular tool's protocol changes, as long as the user knows the systems management port they can effectively "rediscover" this using this method.

An example flow is described in which the hostname is given as host.ibm.com, the CMCI port 8888 and the SM Data port 9999.

1) A user creates a CMCI connection to host.ibm.com using port 9999 (which is incorrect) and clicks connect.
2) CICS Explorer attempts to connect and receives HTML data instead of XML.
3) CICS Explorer attempts to connect as an SM Data connection.
4) Failure: Report error to user that connection could not be made.
5) CICS Explorer uses the SM Data API to look up available TCP/IP services and find a CMCI port
6) Failure: Report error to user that user specified an SM Data port and CMCI might not be available.
7) CICS Explorer reports the correct CMCI port to the user and offers to update the connection details accordingly.

In another scenario the user is attempting to connect to DTCN (the CICS Debug agent) on port 8888—the correct port should be 1111.

1) A user creates a DTCN connection to host.ibm.com using port 9999 (which is incorrect) and clicks connect.
2) CICS Explorer attempts to connect and receives the wrong data response—DTCN connection throws an exception.
3) CICS Explorer attempts to connect as an Systems Management Connection
4) The TCP/IP services and ports, as well as the URI maps (the combination of which defines the protocols available) are returned to the DTCN connection.
5) The DTCN connection queries the TCP/IP services and URI maps to determine which port matches the protocol identifiers (in this case the URM on the TCP/IP service) and identifies the correct one to use.
6) CICS Explorer reports the correct DTCN port to the user and offers to update the connection details accordingly.

The TCP/IP ports and services may be pre-configured in the registry such as with CICS where named TCP/IP services are created on a CICS region.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), compact disc read/write (CD-R/W) or DVD disc, an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages (Java and all Java-based trademarks and logos are trademarks or registered trademarks of Oracle and/or its affiliates; other marks may be trademarks or registered trademarks of their respective owners). The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In one alternative, the preferred embodiment of the present invention may be realized in the form of a computer implemented method of deploying a service comprising steps of deploying computer program code operable to, when deployed into a computer infrastructure and executed thereon, cause said computer system to perform all the steps of the method.

In a further alternative, the preferred embodiment of the present invention may be realized in the form of a data carrier having functional data thereon, said functional data comprising functional computer data structures to, when loaded into a computer system and operated upon thereby, enable said computer system to perform all the steps of the method.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as an FPGA.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be clear to one skilled in the art that many improvements and modifications can be made to the foregoing exemplary embodiment without departing from the scope of the present invention.

The invention claimed is:

1. A method, in a data processing system, for correct port identification in a network host connection, comprising:
   responsive to a user, at a client, attempting to connect to a service at the network host via a client connection request using an incorrect port thereby forming a failed connection, activating, by the network host, a registry service at the network port of the network host to extract client information associated with the failed connection from the client and registered information for the service to which the user is attempting to connect;
   using the client information associated with the failed connection, searching, by the registry service, a registry for a match for the client information with registered information registered at the registry for a service listening on one or more ports, wherein the registry is a set of ports on the network host and services listening on each port of the set of ports, the registry including the registered information capable of identifying each service provided by each port; and
   responsive to identifying a port for the service to which the user is attempting to connect, automatically connecting, by the registry service, the failed connection to the identified port.

2. The method as claimed in claim 1, wherein the registry is created using information relating to a protocol used by the service listening on the one or more ports.

3. The method as claimed in claim 2, wherein the registered information capable of identifying each service provided by each port includes one or more of the group of: a service name, a uniform resource identifier (URI), a uniform resource name (URN), a uniform resource locator (URL), and a connection message.

4. The method as claimed in claim 1, wherein the registry is created by registering a port at the registry when adding a listening service to the port.

5. The method as claimed in claim 1, wherein the registry is created by pre-configuring ports, services, and protocols in the registry.

6. The method as claimed in claim 1, wherein extracting the client information associated with the failed connection includes identifying a protocol being utilized by the client in the client connection request.

7. A system for correct port identification in a network host connection, comprising:
   a processor; and
   a memory coupled to the processor, wherein the memory comprises instructions which, when executed by the processor, cause the processor to:
   responsive to a user, at a client, attempting to connect to a service at the network host via a client connection request using an incorrect port thereby forming a failed connection, activating a registry service at the network port of the network host to extract client information associated with the failed connection from the client and registered information for the service to which the user is attempting to connect;
   using the client information associated with the failed connection, search, by the registry service, a registry for a match for the client information with registered information registered at the registry for a service listening on one or more ports, wherein the registry is a set of ports on the network host and services listening on each port of the set of ports, the registry including the registered information capable of identifying each service provided by each port; and
   responsive to identifying a port for the service to which the user is attempting to connect, automatically connect, by the registry service, the failed connection to the identified port.

8. The system as claimed in claim 7, wherein the registry is created using information relating to the protocol used by the service listening on the one or more ports.

9. The system as claimed in claim 8, wherein the registered information capable of identifying each service provided by each port includes one or more of the group of: a service name, a uniform resource identifier (URI), a uniform resource name (URN), a uniform resource locator (URL), a connection message.

10. The system as claimed in claim 7, wherein the registry is created by registering a port at the registry when adding a listening service to the port.

11. The system as claimed in claim 7, wherein the registry is created by pre-configuring ports, services, and protocols in the registry.

12. The system as claimed in claim 7, wherein the instructions to extract the client information associated with the failed connection further cause the processor to:
   identify a protocol being utilized by the client in the client connection request.

13. A computer program product for correct port identification in a network host connection, the computer program product comprising a computer readable storage having a computer readable program stored therein, wherein the computer readable program, when executed on a computing device, causes the computing device to:
   responsive to a user, at a client, attempting to connect to a service at the network host via a client connection request using an incorrect port thereby forming a failed connection, activate, by the network host, a registry service at the network host to extract client information associated with the failed connection from the client and registered information for the service to which the user is attempting to connect;
   using the client information associated with the failed connection, search, by the registry service, a registry for a match for the client information with registered information registered at the registry for a service listening on one or more ports, wherein the registry is a set of ports on the network host and services listening on each port of the set of ports, the registry including the registered information capable of identifying each service provided by each port; and
   responsive to identifying a port for the service to which the user is attempting to connect, automatically connect, by the registry service, the failed connection to the identified port.

14. The computer program product of claim 13, wherein the registry is created using information relating to the protocol used by the service listening on the one or more ports.

15. The computer program product of claim 13, wherein the registered information capable of identifying each service provided by each port includes one or more of the group of: a service name, a uniform resource identifier (URI), a uniform resource name (URN), a uniform resource locator (URL), a connection message.

16. The computer program product of claim 13, wherein the registry is created by registering a port at the registry when adding a listening service to the port.

17. The computer program product of claim 13, wherein the registry is created by pre-configuring ports, services, and protocols in the registry.

18. The computer program product of claim 13, wherein the computer readable program to extract the client information associated with the failed connection further causes the computing device to:
   identify a protocol being utilized by the client in the client connection request.

* * * * *